United States Patent [19]

Kitagishi et al.

[11] Patent Number: 4,500,188
[45] Date of Patent: Feb. 19, 1985

[54] FOCUSING DEVICE FOR A CAMERA

[75] Inventors: Nozomu Kitagishi, Inagi; Akira Tajima, Kawasaki, both of Japan

[73] Assignee: Canon Kabushiki Kaisha, Tokyo, Japan

[21] Appl. No.: 529,717

[22] Filed: Sep. 6, 1983

[51] Int. Cl.³ .............................................. G03B 7/08
[52] U.S. Cl. ................................................... 354/406
[58] Field of Search ................ 354/402, 404, 406–409; 250/201 PF, 204

[56] References Cited

U.S. PATENT DOCUMENTS 4,220,850  9/1980  McEachern ..................... 354/406 X
4,303,321  12/1981  Enomoto et al. ................... 354/406
4,314,748  2/1982  Kawabata et al. ................... 354/409

Primary Examiner—William B. Perkey
Attorney, Agent, or Firm—Fitzpatrick, Cella, Harper & Scinto

[57] ABSTRACT

A focusing device in which, in a condition in which the focus detecting operation is impossible, when the set focus position of the picture-taking lens is on the short distance focus side, the lens is forcibly shifted to the long distance focus side and when the set focus position is on the long distance focus side, the lens is shifted to the short distance focus side, whereby the device can quickly get away from the condition in which the focus detecting operation is impossible.

6 Claims, 6 Drawing Figures

FOCUSING DEVICE FOR A CAMERA

BACKGROUND OF THE INVENTION

1. Field of the Invention

This invention relates to an auto-focusing control system, and particularly to an automatic focusing device provided with focus detecting means for detecting the focus adjustment state of a lens system relative to an object and lens system control means for controlling the lens system to cause the lens system to be focused to the object on the basis of the output of the focus detecting means.

2. Description of the Prior Art

A device is known in which light-receiving elements capable of responding to the sharpness of an image are disposed, for example, forwardly and rearwardly of the predetermined focal plane of a lens system and the outputs of these light-receiving elements corresponding to the sharpness of the image are compared, whereby detection and control of the focus of the lens system are effected. In such a device, control of the focus is effected by detecting the magnitude relation between the outputs of the light-receiving elements, and for example, where the object lies at a great distance and the lens system is set to the in-focus position on the short distance side, or in the converse case or where the focal length of the lens system is relatively long and the focus thereof is deviated, the blur of the images on the two light-receiving elements becomes remarkably great, that is, the sharpness of the images becomes remarkably low and therefore, it becomes difficult to discriminate the focus and focusing control often becomes impossible.

This will hereinafter be described specifically. An auto-focusing control system is known in which, as shown, for example, in FIG. 1 of the accompanying drawing, light-receiving elements 3 and 4 capable of responding to the sharpness of the image are disposed at equidistant positions forward and rearward of the predetermined focal plane 2 of an objective lens 1 and the outputs of the light-receiving elements 3 and 4 corresponding to the sharpness of the image are compared to thereby discriminate the in-focus, the near focus and the far focus and the objective lens 1 is driven to the in-focus position, and in this system, where the output of the light-receiving element 3 corresponding to the sharpness of the image is greater than that of the light-receiving element 4 (the near focus state, i.e., the state indicated by dotted line in FIG. 2 of the accompanying drawings), the objective lens 1 is driven in a direction for inwardly displacing the objective lens 1, namely, toward the long distance in-focus position side and conversely, where the output of the light-receiving element 4 corresponding to the sharpness of the image is greater than that of the light-receiving element 3 (the far focus state, namely, the state indicated by solid line in FIG. 2), the objective lens 1 is driven in a direction for outwardly displacing the objective lens 1, namely, toward the short distance in-focus position side, and the objective lens 1 is stopped at the infocus position (the state of FIG. 1) whereat the outputs of the light-receiving elements 3 and 4 corresponding to the sharpness of the image become substantially equal to each other.

In the case of an ideal lens system and electric system, even if the lens system is greatly deviated from the in-focus position, when the lens system is in the far focus state, the output of the light-receiving element 4 is considered to be greater than that of the light-receiving element 3, but in the actual system, when the lens system is greatly deviated from the in-focus position due to the noise of the electric system or the aberration of the lens system, particularly, creation of false resolution, the levels of the outputs of the light-receiving elements are sometimes inverted as indicated by a portion ⓐ FIG. 3 of the accompanying drawings. Therefore, the range in which an effective focus detection signal is obtained, that is, the focal-point detectable area of focus detecting means, is limited as indicated between A-B of FIG. 3. If such a limitation is present, where the lens system is positioned outside, the region between A-B, detection of the focus becomes impossible and therefore, control of the lens system also becomes impossible, and this has led to the disadvantage that the state becomes equivalent to the in-focus state in terms of signal and therefore the lens system remains stopped at a wrong position.

Discrimination between the true in-focus state and the false in-focus state which occurs when the focus is greatly deviated can be accomplished at least by a method as will hereinafter be described. That is, as described above, in the in-focus state and incondition in which the focus is greatly deviated, the outputs of the two light-receiving elements become equal to each other, but in the in-focus state, both of the outputs of the two light-receiving elements are above a certain level and accordingly, when the outputs of the two light-receiving elements have become equal to each other, discrimination between the in-focus state and the condition in which the focus is greatly deviated can be accomplished by discriminating whether the output of each of the light-receiving element is above a certain level. Besides this, the above-described discrimination is possible by disposing, for example, a third light-receiving element at the predetermined focal plane position and making such a design that when the outputs of the two light-receiving elements forward and rearward of the predetermined focal plane have become equal to each other, it is discriminated whether the output of the third light-receiving element is above a certain level.

However, these methods only enable the discrimination between the in-focus state and the condition in which the focus is greatly deviated to be accomplished and cannot achieve a drastic solution to the disadvantage that when the focus is greatly deviated, the lens system is stopped at that position and the system cannot get out of such stopped position by its ability.

SUMMARY OF THE INVENTION

The present invention has been made in view of the above-noted situation and has for its object to provide, as an auto-focusing control system, rational means which positively solves the disadvantage that when the focus is greatly deviated, the lens system is stopped at that position and cannot get out of such position by its own ability as a system and moreover which is capable of shifting the lens system to the focal-point detectable area of focus detecting means within a shorter time and by a smaller amount of movement of the lens system. With such object, the auto-focusing control system of the present invention is characterized by the provision of focus detecting means for detecting the focus adjustment state of the lens system relative to an object, lens system control means for controlling the lens system to focus the lens system to the object on the basis of the output of the focus detecting means, and discriminating means for discriminating the position of the lens system stopped in the condition in which the focus detection by the focus detecting means is impossible and instructing the control means to control the lens system toward the short distance side when the stopped position corresponds to the long distance side as compared with the in-focus position and controls the lens system toward the long distance side when the stopped position corresponds to the short distance side as compared with the in-focus position.

Other objects of the present invention will become apparent from the following detailed description of an embodiment thereof taken in conjunction with the accompanying drawings.

DESCRIPTION OF THE PREFERRED EMBODIMENT

A preferred embodiment of the present invention will hereinafter be described with reference to the drawings.

Figure 3:
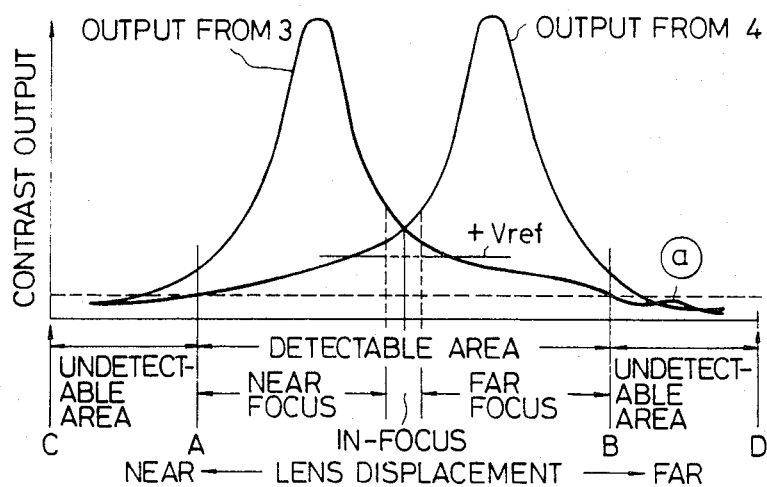
FIG. 3 is a signal waveform graph showing variations in detection signals obtained in the arrangements shown in FIGS. 1 and 2.

The embodiment hereinafter described is basically designated in accordance with the present invention such that when the range in which an effective detection signal is put out (namely, the focus detectable area of focus detecting means) is A-B as shown in FIG. 3, the lens is unconditionally displaced toward the in-focus position on the long distance side when the lens is in an area A-C in which the effective detection signal is not put out (that is, focus detection is impossible) (the short distance in-focus side—the near focus side), that the lens is displaced toward the in-focus position on the short distance side when the lens is in an area B-D in which the effective detection signal is not put out (the long distance in-focus side—the far focus side) and that the lens is controlled to the in-focus position in accordance with the effective detection signal after the lens has been moved into the range A-B in which the effective detection signal is put out.

Such means may be designated to detect the position of the lens when the effective detection signal is no longer obtained from the focus detecting means, to drive the lens toward the long distance in-focus side when the stopped position is on the short distance in-focus side, and to drive the lens toward the short distance in-focus side when the stopped position is on the long distance in-focus side.

Figure 4:
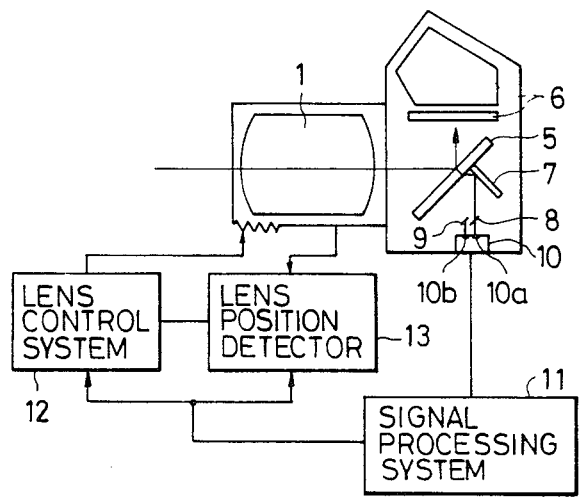
FIG. 4 is a schematic view showing an embodiment of the present invention.
Figure 5:
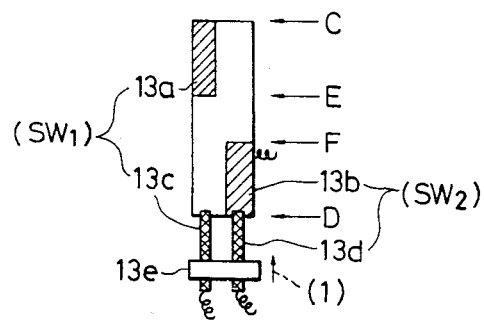
FIG. 5 is a schematic view showing an example of the construction of the position detector shown in FIG. 4.

FIG. 4 shows an example of the case where the present invention is applied to a single lens reflex camera. At least a part of the light beam emergent from an objective lens 1 is divided to a light reflected by a finder mirror 5 which is a half mirror and directed to an observation system 6 and a light downwardly reflected by an auxiliary mirror 7 and directed to the two light-receiving elements 10a and 10b of a light-receiving device 10 by a half mirror 8 and a full mirror 9. The two light-receiving elements 10a and 10b of the light-receiving device 10 are in an arrangement relation optically equivalent to the light-receiving elements 3 and 4 of FIGS. 1 and 2. The photoresponse output obtained by the light-receiving device 10 is processed by a signal processing system 11 and imparted as a focus detection signal to a lens control system 12, through which the lens 1 is driven. In the present embodiment, there is further provided a lens position detector 13 for detecting whether the lens 1 is on the long distance in-focus side or on the short distance in-focus side. The position detector 13 has fixed conductive parts 13a and 13b as shown in FIG. 5 provided, for example, on the outer periphery of a lens barrel along the direction of rotation of a distance adjusting ring (focusing ring), and movable contacts 13c and 13d disposed correspondingly to the adjustment of the lens, namely, the rotation of the distance adjusting ring, and has a position detecting part (switch SW1) formed more adjacent to the short distance in-focus side on the conductive part 13a and the conduct 13c and a position detecting part (switch SW2) formed more adjacent to the long distance in-focus side on the conductive part 13b and the contact 13d. Designated by 13e is a holder for the contacts 13c and 13d.

That is, when the lens 1 lies at such a position whereat the contact 13c contacts the conductive part 13a (the switch SW1 is closed) and the focus detection signal is not obtained, the lens 1 is unconditionally driven toward the long distance in-focus side, and when the lens 1 lies at such a position whereat the contact 13d contacts the conductive part 13b (the switch SW2 is closed) and the focus detection signal is not obtained, the lens 1 is unconditionally driven toward the short distance in-focus side and is automatically shifted until the focus detection signal is obtained.

Incidentally, the spacing E-F between the conductive parts 13a and 13b is set more narrowly than the focal-point detectable area A-B of FIG. 3 in anticipation of safety.

This is because the focal-point detectable area A-B variously varies depending on the condition of the object or the optical system and accordingly, it is safest to determine E-F somewhat more narrowly than the narrowest detectable area A-B.

The circuit system in the present embodiment will now be described by reference to FIG. 6.

Figure 1:
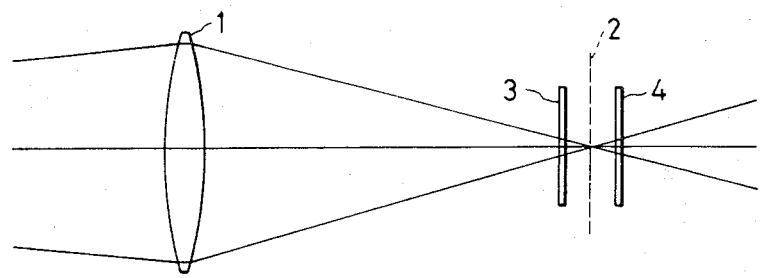
FIGS. 1 and 2 are schematic views for illustrating the principle of the focus detection by the known image sharpness comparison.
Figure 2:
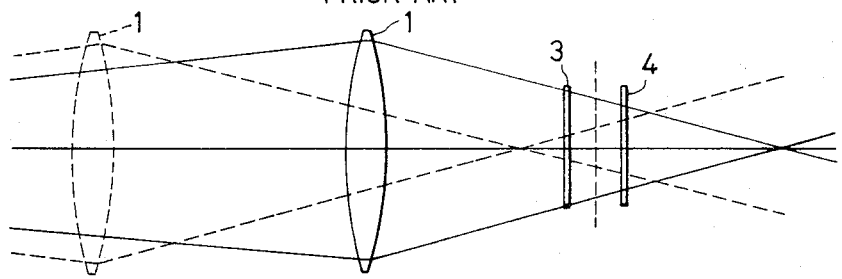
Figure 6:
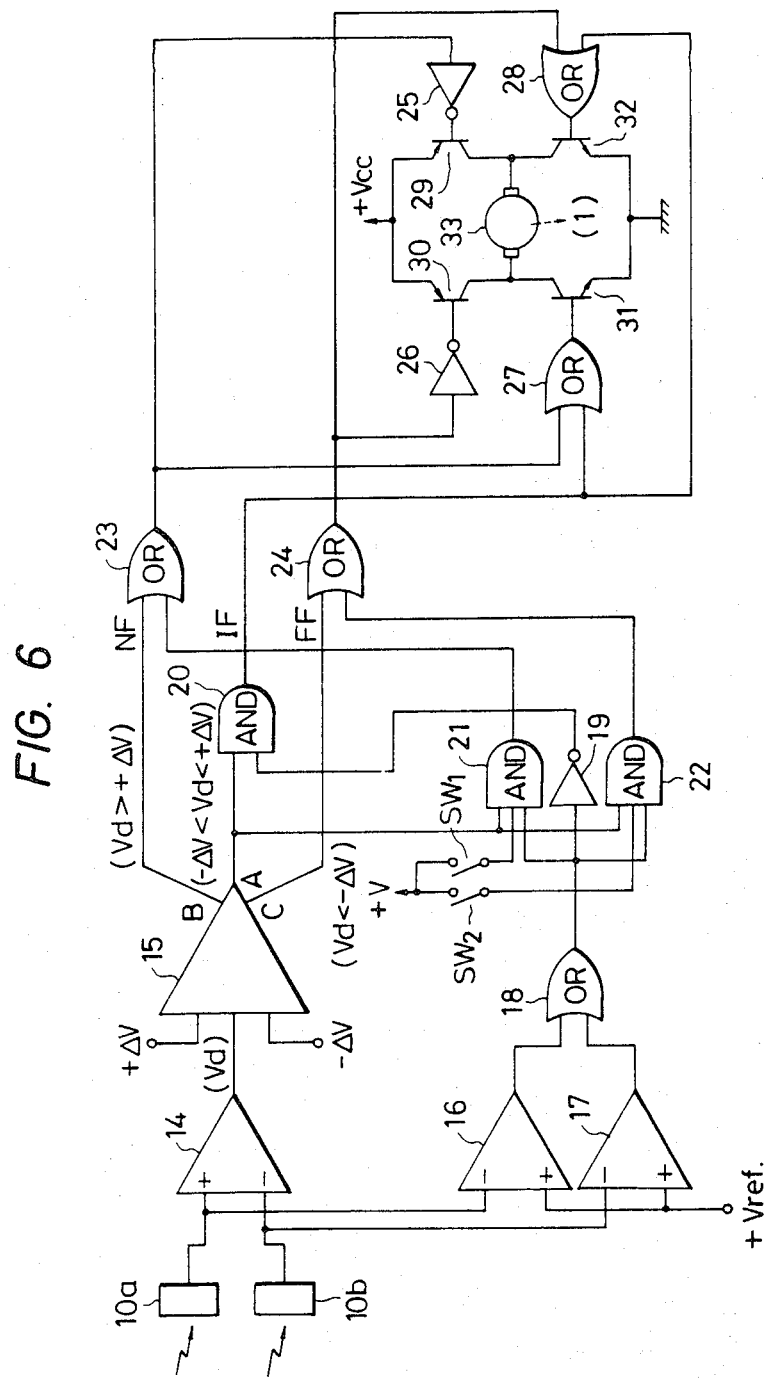
FIG. 6 is a circuit diagram showing the electric circuit system in the embodiment of the present invention.

In FIG. 6, reference characters 10a and 10b designate the already described light-receiving elements which correspond to the light-receiving elements 3 and 4, respectively, of FIGS. 1 and 2 and present outputs corresponding to the sharpness of the image. Reference numeral 14 denotes a differential amplifier for finding the difference between the outputs of the elements 10a and 10b, more specifically, "the output of the element 10a" - "the output of the element 10b" (hereinafter referred to as Vd), and reference numeral 15 designates a comparison circuit (usually comprising a so-called window comparator) for comparing the differential output Vd with predetermined reference levels $+\Delta V$ and $-\Delta V$ for determining the range regarded as the in-focus and putting out a high level signal from an output A when $-\Delta V < Vd < +\Delta V$, putting out a high level signal from an output B when $Vd > +\Delta V$, and putting out a high level signal from an output C when $Vd < -\Delta V$. Ideally, $Vd = 0$ is regarded as in-focus, but this is not realistic and actually, a certain finite width can be regarded as in-focus by the depth of focus, etc. of the lens 1, and the range of the aforementioned reference levels $+\Delta V \sim -\Delta V$ determines this range regarded as in-focus. Thus, the high level of the output B of the comparison circuit 15 indicates the near focus (NF), the high level of the output C indicates the far focus (FF) and the high level of the output A indicates the in-focus (IF) of that the lens is outside (A-C or B-D) the in-focus detectable range (A-B). Reference numeral 16 designates a comparison circuit which puts out a high level signal when the output of the element 10a is lower than a predetermined reference level +Vref, and reference numeral 17 denotes a comparison circuit which puts out a high level signal when the output of the element 10b is lower than the reference level +Vref. As previously described or as can be seen from FIG. 3, in the in-foucs state, both of the outputs of the elements 10a and 10b have a level above a certain level, and the aforementioned reference level +Vref determines this level. Accordingly, where both of the outputs of the elements 10a and 10b are above the reference level +Vref when the output A of the comparison circuit 15 goes to high level, that is, only where both of the outputs of the comparison circuits 16 and 17 are low level, in-focus can be brought about and thus, as previously described, discrimination can be made between the true in-focus and the state in which the focus is greatly deviated. Reference numeral 18 designates an OR gate for receiving the outputs of the comparison circuits 16 and 17, reference numeral 19 denotes an inverter for inverting the output of the OR gate 18, and reference numeral 20 designates an AND gate for receiving the output of the inverter 19 and the output A of the comparison circuit 15. After all, in-focus (IF) is indicated by the high level of the output of the AND gate 20. What has been described above is the construction of focus detecting means which detects the focus adjustment state of the lens 1 in the present embodiment, that is, the distinction between in-focus, near focus and far focus.

Reference numeral 21 designates an AND gate for receiving the output A of the comparison circuit 15, the output of the OR gate 18 and the signal of the switch SW1 comprising the conductive part 13a and contact 13c of FIG. 5, and reference numeral 22 denotes an AND gate for receiving the output A of the comparison circuit 15, the output of the OR gate 18 and the signal of the switch SW2 comprising the conductive part 13b and contact 13d of FIG. 5. In the construction of the position detector 13 of FIG. 5, a positive voltage is imparted to any of the conductive parts 13a, 13b, or the contacts 13c, 13d and accordingly, when the conductive parts come into contact with the contacts and thereby the switches are closed, the switch signals go to high level. Thus, the high level of the output of the AND gate 21 indicates that the lens 1 lies in the focal-point undetectable area (A-C of FIG. 3) on the short distance in-focus side (the near focus side), and the high level of the output of the AND gate 22 indicates that the lens 1 lies in the focal-point undetectable area (B-D of FIG. 3) on the long distance in-focus side (the far focus side), and as will later be described, the high level output of the AND gate 21 is used to forcibly move the lens 1 to the long focus in-focus side and the high level output of the AND gate 22 is used to forcibly move lens 1 to the short distance in-focus side. What has been described above is the construction of the previously described discriminating means which is the primary object of the improvement according to the present embodiment of the present invention.

Reference numeral 23 designates an OR gate for receiving the output B of the comparison circuit 15 and the output of the AND gate 21, reference numeral 24 denotes an OR gate for receiving the output C of the comparison circuit 15 and the output of the AND gate 22, reference numeral 25 designates an inverter for inverting the output of the OR gate 23, reference numeral 26 denotes an inverter for inverting the output of the OR gate 24, reference numeral 27 designates an OR gate for receiving the output of the AND gate 20 and the output of the OR gate 23, reference numeral 28 denotes an OR gate for receiving the output of the AND gate 20 and the output of the OR gate 24, reference numerals 29, 30 and 31, 32 designate complementarily, connected pnp and npn switching transistors, and reference numeral 33 denotes a lens driving motor whose forward and reverse revolutions and stoppage are controlled by the transistors and stoppage are controlled by the transistors 29-32. What has been described above is the construction of the lens control means in the present embodiment.

Now, in the above-described construction, if, for example, the lens 1 is in the near focus state, the output B of the comparison circuit 15 goes to high level and therefore, the output of the OR gate 23 goes to high level and accordingly, the output of the inverter 25 goes to low level, while the output of the OR gate 27 goes to low level. On the other hand, in this case, both of the outputs of the AND gate 20 and the OR gate 24 are low and therefore, the output of the inverter 26 is high level and the output of the OR gate 28 is low level. Accordingly, the transistors 29 and 31 are turned on while the transistors 30 and 32 remain to be in OFF state, and the motor 33 is revolved forwardly, for example, so that the lens 1 is displaced toward the long distance in-focus side. Conversely, when the lens 1 is in the far focus state, the output C of the comparison circuit 15 goes to high level and therefore, the output of the OR gate 24 goes to high level and accordingly, the output of the inverter 26 goes to low level, while the output of the OR gate 28 goes to high level. At this time, both of the outputs of the AND gate 20 and the OR gate 23 are low level and therefore, the output of the inverter 25 is high level and the output of the OR gate 27 is low level. Accordingly, the transistors 30 and 32 are turned on while the transistors 29 and 31 remain to be in OFF state, and the motor 33 is revolved reversely and the lens 1 is displaced toward the short distance in-focus side.

In any case, when the lens 1 arrives at the in-focus position, the output of the AND gate 20, instead of the so far outputs of the OR gates 23 and 24, goes to high level and accordingly, both of the outputs of the inverters 25 and 26 goes to high level while, at the same time, both of the outputs of the OR gates 27 and 28 also go to high level and the transistors 29 and 30 are turned off, while the transistors 31 and 32 are turned on and the motor 33 is stopped.

What has been described is the operation when the lens 1 is in the focal-point detectable area A-B, but the operation is as follows in accordance with the improvement according to the present invention when the lens 1 is in the focal-point undetectable area.

First, when the lens 1 is in the focal-point undetectable area A-C on the short distance in-focus side (the near focus side) of FIG. 3, the output A of the comparison circuit 15 goes to high level and the output of the OR gate 18 also goes to high level, and the switch SW1 is closed and the switch signal thereof goes to high level, so that the output of the AND gate 21 goes to high level and accordingly, the output of the OR gate 23 goes to high level and, as in the case of the aforedescribed near focus state, the lens 1 is displaced toward the long distance in-focus side. Conversely, when the lens 1 is in the focal-point undetectable area B-D on the long distance in-focus side (the far focus side) of FIG. 3, the output A of the comparison circuit 15 goes to high level and the output of the OR gate 18 also goes to high level, and the switch SW2 is closed and the switch signal thereof becomes high level, so that the output of the AND gate 22 becomes high level and accordingly, the output of the OR gate goes to high level and, as in the case of the aforedescribed far focus state, the lens 1 is displaced toward the short distance in-focus side. Thus, in any case, the lens 1 is shifted toward the focal-point detectable area A-B and when it comes into the focal-point detectable area A-B, the lens 1 is continuedly controlled by the output of the focus detecting means and finally stopped at the in-focus position.

The operation by the construction of the present embodiment has been described above.

As described above in detail, according to the improvement of the present invention, even when the lens system is outside the focal-point detectable area of the focus detecting means, it is possible to automatically shift the lens system into the focal-point detectable area and finally bring it to the in-focus position, and this is very useful particularly in an auto-focusing control system wherein the focal-point detectable area of the focus detecting means cannot cover the entire focus adjustment range of the lens system.

What we claim is:

1. A focusing device for a camera, comprising
    (a) a focus detecting circuit for forming a signal indicative of the state of focusing degree;
    (b) a picture-taking lens driving circuit for driving a picture-taking lens to the in-focus position on the basis of the signal indicative of the state of focusing degree from said focus detecting circuit;
    (c) signal forming means for forming an impossibility signal when the focus detecting operation of said focus detecting circuit is impossible; and
    (d) a position detecting portion for detecting the set focus position of the picture-taking lens and forming a first signal when the set position is on the short distance focus side and forming a second signal when the set position is on the long distance focus side;
    (e) said driving circuit being responsive to said impossibility signal and said first signal to drive the picture-taking lens to the long distance focus side and responsive to said impossibility signal and said second signal to drive the picture-taking lens to the short distance focus side.

2. A focusing device according to claim 1, wherein there is provided inhibiting means responsive to said impossibility signal to inhibit the response of said driving circuit to the output signal of said focus detecting circuit.

3. A focusing device for camera, comprising:
    (a) a light-receiving portion for receiving a light through a picture-taking lens;
    (b) a focus detecting circuit for detecting the output of said light-receiving portion and effecting detection of the focusing degree, putting out a first signal when the picture-taking lens is in the near focus state, putting out a second signal when the picture-taking lens is in the far focus state, and putting out a third signal when the picture-taking lens is in the in-focus state;
    (c) a picture-taking lens driving circuit responsive to said first signal to drive the picture-taking lens toward the long distance focus, responsive to said second signal to drive the picture-taking lens toward the short distance focus, and responsive to said third signal to stop the driving of the picture-taking lens;
    (d) signal forming means for detecting the output of said light-receiving portion and forming an impossibility signal when the output of said light-receiving portion is below a predetermined level; and
    (e) a position detecting portion for detecting the set focus position of the picture-taking lens and forming a first signal when the set position is on the short distance focus side and forming a second signal when the set position is on the long distance focus side;
    (f) said driving circuit being responsive to said impossibility signal and said first signal to drive the picture-taking lens to the long distance focus side and responsive to said impossibility signal and said second signal to drive the picture-taking lens to the short distance focus side.

4. A focusing device according to claim 3, wherein there is provided inhibiting means responsive to said impossibility signal to inhibit the response of said driving circuit to the output signal of said focus detecting circuit.

5. A focusing device for a camera, comprising:
    (a) focus detecting circuit having a light-receiving portion for receiving a light through a picture-taking lens, said circuit forming a signal indicative of the state of focusing degree on the basis of the output of said light-receiving portion in a condition in which the focusing degree is detectable and forming an impossibility signal in a condition in which the focusing degree is undetectable;
    (b) a picture-taking lens driving circuit for driving a picture taking lens to the in-focus position on the basis of the signal indicative of the state of focusing degree from said focus detecting circuit; and
    (c) a position detecting portion for detecting the set focus position of the picture-taking lens and forming a first signal when the set position is on the short distance focus side and forming a second signal when the set position is on the long distance focus side;
    (d) said driving circuit being responsive to said impossibility signal and said first signal to drive the picture-taking lens to the long distance focus side and responsive to said impossibility signal and said second signal to drive the picture-taking lens to the short distance focus side.

6. A focusing device according to claim 5, wherein there is provided inhibiting means responsive to said impossibility signal to inhibit the response of said driving circuit to the output signal of said focus detecting circuit.

* * * * *

UNITED STATES PATENT AND TRADEMARK OFFICE
CERTIFICATE OF CORRECTION

PATENT NO. : 4,500,188
DATED      : February 19, 1985
INVENTOR(S): KITAGISHI, ET AL.

It is certified that error appears in the above-identified patent and that said Letters Patent is hereby corrected as shown below:

Please enter on the Title page, the Foreign Application Priority Data as follows:

-- [30]   Foreign Application Priority Data

Sept. 13, 1982 [JP] Japan...........56/160162 --

Col. 2, line 13, after "outside" delete -- , --;

line 24, change "incondition" to --in the condition--.

Signed and Sealed this

Twenty-second Day of October 1985

[SEAL]

Attest:

Attesting Officer

DONALD J. QUIGG

Commissioner of Patents and Trademarks—Designate